United States Patent

(12) United States Patent
Meng et al.

(10) Patent No.: US 12,718,007 B2
(45) Date of Patent: Aug. 25, 2026

(54) DOCUMENT AUTO-COMPLETION

(71) Applicant: Microsoft Technology Licensing, LLC, Redmond, WA (US)

(72) Inventors: Si Meng, Beijing (CN); Jinge Yao, Redmond, WA (US); Chin-Yew Lin, Redmond, WA (US); Zhang Li, Bellevue, WA (US); Fangrong Chen, Redmond, WA (US); Tao Wu, Redmond, WA (US); Sun Mao, Redmond, WA (US); Vincent Etter, Redmond, WA (US); Genglin Huang, Redmond, WA (US); Jing Liu, Beijing (CN); Peter Kurt Allenspach, Redmond, WA (US); Bogdan Popp, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/368,405

(22) Filed: Sep. 14, 2023

(65) Prior Publication Data

US 2024/0005089 A1 Jan. 4, 2024

Related U.S. Application Data

(63) Continuation of application No. 17/435,332, filed as application No. PCT/CN2019/085243 on Apr. 30, 2019, now Pat. No. 11,797,756.

(51) Int. Cl.

*G06F 40/106* (2020.01)
*G06F 16/907* (2019.01)

(Continued)

(52) U.S. Cl.

CPC .......... *G06F 40/174* (2020.01); *G06F 40/106* (2020.01); *G06F 40/253* (2020.01)

(58) Field of Classification Search

None

See application file for complete search history.

(56) References Cited

U.S. PATENT DOCUMENTS

2013/0031096 A1* 1/2013 Sutter .................. G06F 16/958 707/E17.014
2014/0372857 A1* 12/2014 Otero .................. G06F 40/174 715/220

(Continued)

FOREIGN PATENT DOCUMENTS

CN 106575287 A 4/2017
CN 108351868 A 7/2018

OTHER PUBLICATIONS

First Office Action Received for Chinese Application No. 201980043598.3, mailed on Apr. 11, 2024, 11 pages. (English Translation Provided).

(Continued)

*Primary Examiner* — Mustafa A Amin

(74) *Attorney, Agent, or Firm* — Schwegman Lundberg & Woessner, P.A.

(57) ABSTRACT

The present disclosure provides method and apparatus for document auto-completion. In an aspect, an instruction for creating a document may be received. The document may be presented in response to the instruction, at least a first section in the document including content suggested according to context information associated with the document. An edit operation to the document may be received. Content suggested in response to the edit operation may be presented in at least a second section in the document. In another aspect, context information associated with completion of a document may be identified. Content of at least one section in the document may be generated, the content being sug- (Continued)

gested based at least on the context information. The content may be presented in the at least one section in the document.

20 Claims, 16 Drawing Sheets

(51) Int. Cl.
*G06F 40/174* (2020.01)
*G06F 40/253* (2020.01)

(56) References Cited

U.S. PATENT DOCUMENTS

2016/0042370 A1* 2/2016 Ludwig .............. G06Q 30/0203 705/7.32
2016/0124930 A1* 5/2016 Dhawan ................ G06F 40/197 715/224
2017/0046622 A1* 2/2017 Gaither ................ G06F 40/247
2017/0220544 A1* 8/2017 Masson ................ G06F 16/951
2017/0357627 A1* 12/2017 Peterson ................ G06F 7/023
2018/0181866 A1* 6/2018 Dalle .................... G06N 20/00
2018/0211265 A1* 7/2018 Natarajan .......... G06Q 30/0202
2018/0365325 A1* 12/2018 Gireesha ................ G06F 16/38
2020/0192921 A1* 6/2020 Satterfield ........... G06F 16/3323
2020/0364400 A1* 11/2020 Bosworth ........... G06F 21/6209

OTHER PUBLICATIONS

Decision of Rejection Received for Chinese Application No. 201980043598.3, mailed on Feb. 28, 2025, 11 pages (English Translation Provided).
Communication pursuant to Rules 70(2) and 70a(2) EPC dated Nov. 11, 2020, from European Patent Application No. 19926960.6, 1 p.
Second Office Action Received for Chinese Application No. 201980043598.3, mailed on Nov. 27, 2024, 06 Pages (English Translation Provided).

* cited by examiner

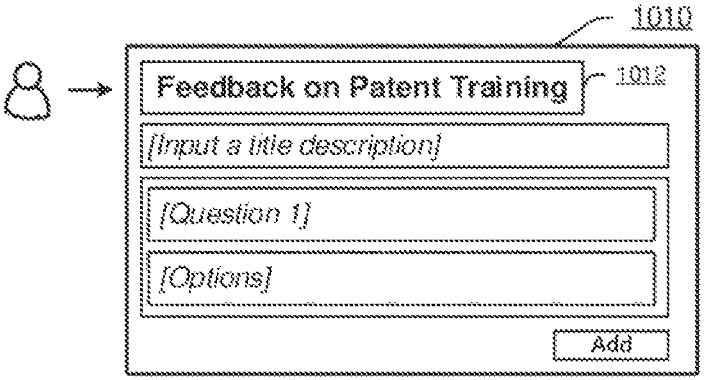
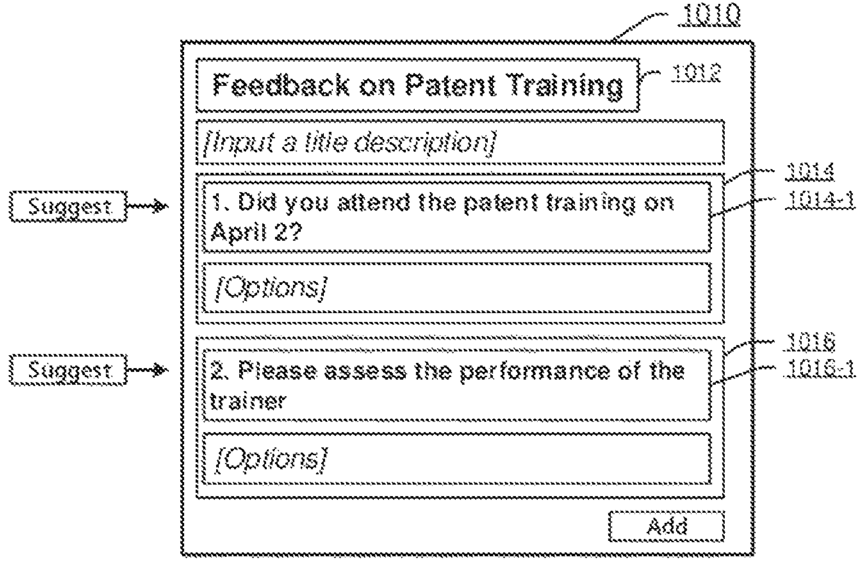
FIG 10

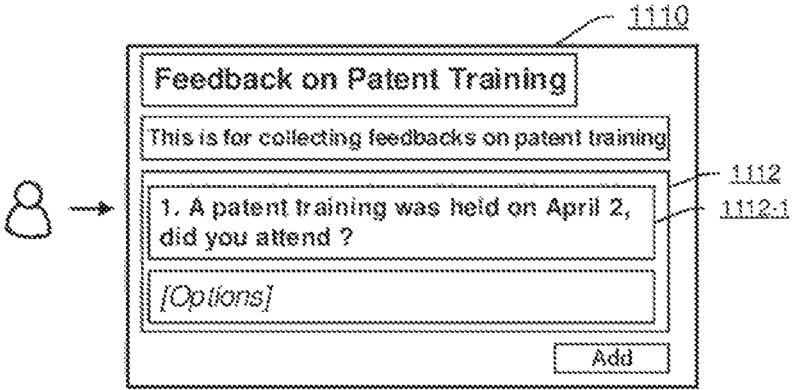
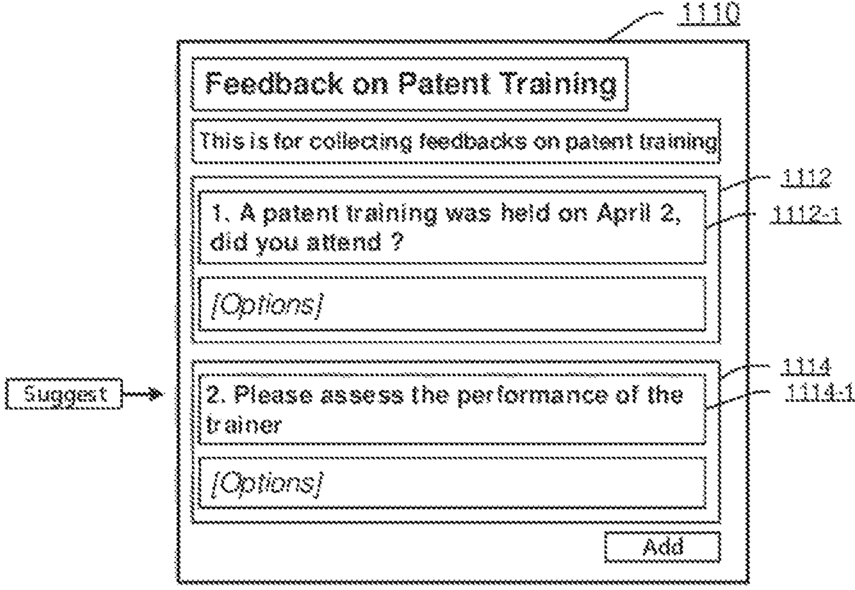
FIG 11

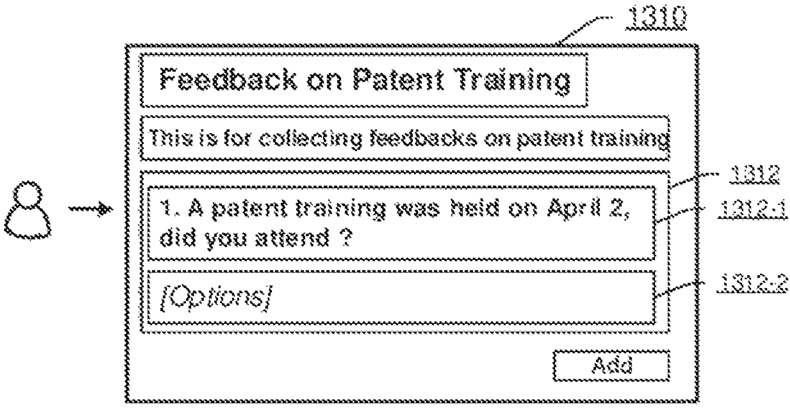
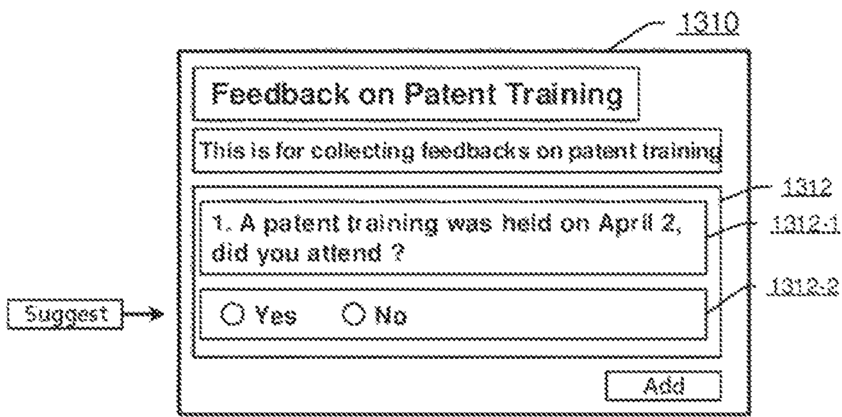
FIG 13

1410

Feedback on Patent Training

This is for collecting feedbacks on patent training

1. A patent training was held on April 2, did you attend ?

Yes No

2. Please assess the performance of the trainer

Perfect

Normal

Poor

Suggest

Suggest

Add

1412

1412-1

1412-2

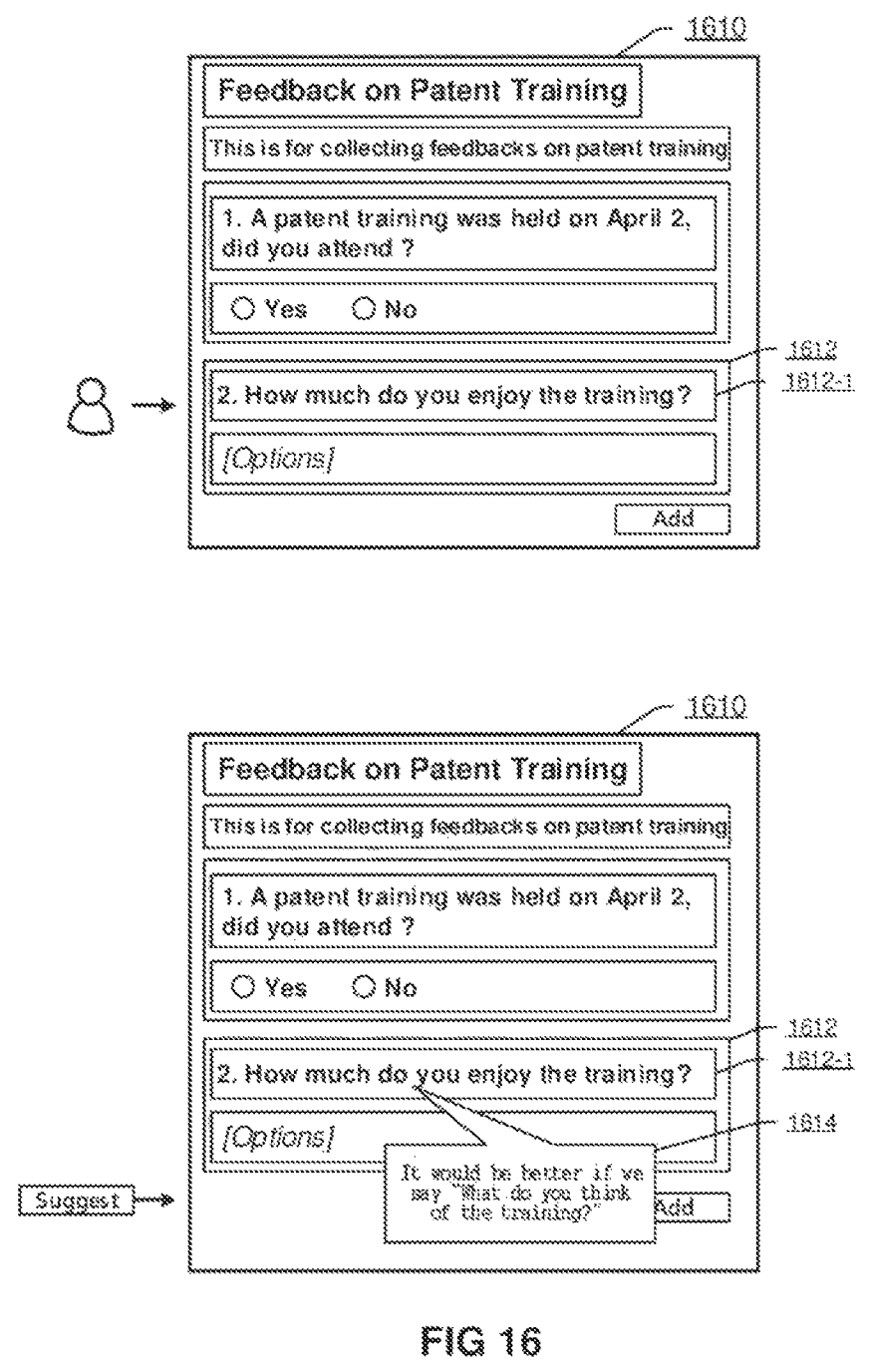

1610

Feedback on Patent Training

This is for collecting feedbacks on patent training

1. A patent training was held on April 2, did you attend ?

Yes No

1612

1612-1

2. How much do you enjoy the training?

[Options]

Add

1610

Feedback on Patent Training

This is for collecting feedbacks on patent training

1. A patent training was held on April 2, did you attend ?

Yes No

1612

1612-1

2. How much do you enjoy the training?

1614

[Options]

Suggest

It would be better if we say "What do you think of the training?"

Add

FIG 16

DOCUMENT AUTO-COMPLETION

CROSS-REFERENCE TO RELATED APPLICATION

This application is a continuation of U.S. patent application Ser. No. 17/435,332, filed Aug. 31, 2021, which application is a U.S. National Stage Filing under 35 U.S.C. 371 of International Patent Application Serial No. PCT/CN2019/085243, filed Apr. 30, 2019, and published as WO 2020/220283 A1 on Nov. 5, 2020, which applications and publication are incorporated herein by reference in their entirety.

BACKGROUND

Various types of document may be created and edited through corresponding applications or platforms. Herein, a document refers to an electronic information record in which content may be added, deleted or modified by users. Usually, content in a document shall be typed in or input by users. For example, form is a type of document, which is used for collecting data from audiences. Typically, a form may comprise content associated with a certain topic, and it is desired to distribute the form to audiences and collect responses or feedbacks to the content in the form from the audiences. When a user is editing a form, the user is required to type in quite a lot of content, e.g., title, questions, options, etc

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for document auto-completion. In an aspect, an instruction for creating a document may be received. The document may be presented in response to the instruction, at least a first section in the document including content suggested according to context information associated with the document. An edit operation to the document may be received. Content suggested in response to the edit operation may be presented in at least a second section in the document. In another aspect, context information associated with completion of a document may be identified. Content of at least one section in the document may be generated, the content being suggested based at least on the context information. The content may be presented in the at least one section in the document.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

FIG. 10 illustrates exemplary user interfaces for suggesting at least one question according to an embodiment.

FIG. 11 illustrates exemplary user interfaces for suggesting at least one question according to an embodiment.

FIG. 13 illustrates exemplary user interfaces for suggesting options according to an embodiment.

FIG. 16 illustrates exemplary user interfaces for providing a modification suggestion according to an embodiment.

DETAILED DESCRIPTION

Figure 1:
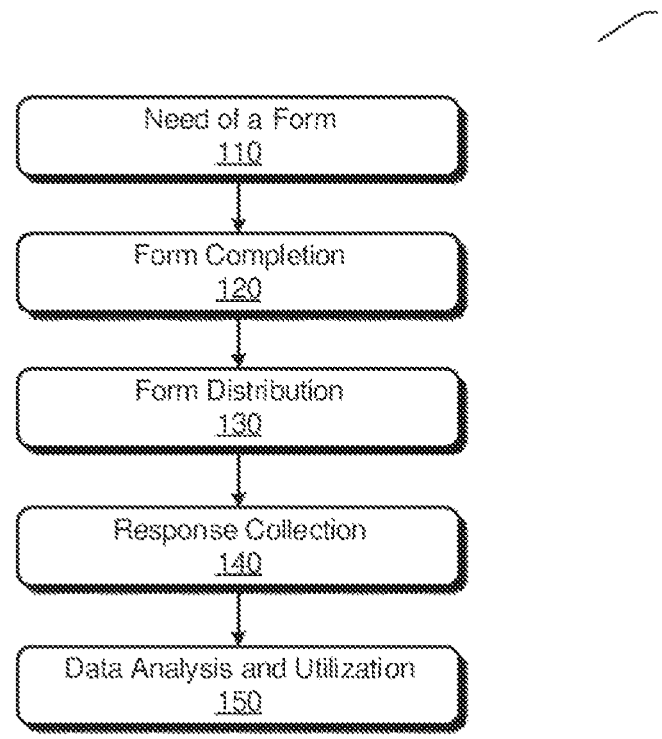
FIG. 1 illustrates an exemplary application process of form according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Usually, it is time-consuming for a user to type in content into a document or to edit content in a document. Taking a form as an example, it would be tedious for a user to type in all the questions and options into the form. Moreover, it is also easy to miss out certain content that should have been included in the form, e.g., some necessary questions or options.

Some document auto-completion techniques have been proposed for assisting users to input content into a document. When a user is inputting a character string into a document, the remaining part of the character string that has not been input by the user yet may be suggested through document auto-completion, and the user may adopt the suggested content to complete the input of the character string. For example, for a form, a number of candidate questions or options may be prepared previously, and when a user is typing in a certain question or option in the form, some related candidate questions or options may be provided to the user as suggested content for assisting the user to complete the form. However, these suggested questions or options are merely in predetermined and fixed patterns or expressions, and they may be less relevant to or not adaptive to what the user is intending to further input, thus the suggested content are very likely not adopted by the user directly. The user may still need to spend time to edit the suggested content or simply disregard them.

Embodiments of the present disclosure propose to implement document auto-completion through providing precise content suggestions. When a user is creating or editing a document, the embodiments of the present disclosure may provide or present content suggestions according to context information associated with the document. The context information may comprise, e.g., content having been input in the document, target entity information associated with the document, user information that are outside of the document, etc., wherein the target entity information may refer to various types of information about a topic to which the document directs, and the user information may comprise profile of the user, information about the document provided by the user, expression habits and patterns of the user, etc. The content suggestions are generated or provided based at least on the context information, and thus may be more precise and more adaptive to the user's desires. Accordingly, the efficiency of completing a document may be improved significantly.

It should be appreciated that although the following discussions focus on form auto-completion, it is merely an example of document auto-completion, and any processes or operations discussed below in connection with the form auto-completion may be applied on any other types of document in a similar way so as to achieve document auto-completion.

FIG. 1 illustrates an exemplary application process 100 of form according to an embodiment. As discussed above, a form may be used for collecting data, e.g., responses to content in the form, from audiences. The form may be applied for various purposes or scenarios, e.g., survey, training, workshop, registration, voting, test, homework, etc.

At 110, it may be determined whether a user needs to distribute a form to audiences. For example, a salesman may want to know his clients' opinions on a new proposed service or product, and thus the salesman may need to send to his clients a survey form including some questions about the service or product, and accordingly collect answers to the questions from his clients. For example, for a conference registration process, an organizer of the conference may need to establish a registration form for collecting personal information of attendees of the conference. For example, a teacher may want to establish a test form for evaluating learning effects of students for a certain course.

After determining at 110 that there is a need of a form, the form may be created and completed through a form application, a form client, a form platform, etc., at 120. Various types of content may be added into corresponding sections in the form. The sections of the form may comprise at least one of: a title section, including a title of the form which indicates a topic of the form; a title description section, including title or form description for explaining, e.g., the purpose of the form, the meaning of the title, etc.; and one or more interaction sections, including various items intended for providing interested issues to audiences and collecting responses to the issues from the audiences. For example, an interaction section may comprise: a question item, including content or question for which responses are desired to obtain from the audiences; and an option item, which provides content or options for the audiences to select or provides an input area for the audiences to input. Types of question in the question item in the interaction section may comprise, e.g., multiple choice question, rating scale question, yes/no question, free text input requirement, etc. Accordingly, options in the option item in the interaction section may comprise multiple choices, rating scales, yes/no choices, free text input area, etc.

The embodiments of the present disclosure may provide content suggestions during the form completion at 120, so as to assist the user to complete the form efficiently. For example, the suggested content may comprise content of the title section, content of the title description section, content of a question item in an interaction section, content of an option item in an interaction section, etc.

At 130, the completed form may be distributed to audiences who are expected to receive the form.

In an implementation, the audiences may be determined automatically from calendar, chat history, document edit history, etc. For example, for a workshop survey form, audiences may be determined as attendees of the workshop indicated, e.g., in the calendar. For example, for an employee satisfaction survey form within a department, audiences may be determined as all the employees in the department. For example, for a conference registration form, audiences may be determined as all the recipients of an email related to the conference in a mailbox of the user.

In an implementation, it may be determined at what time the form should to be distributed to the audiences. For example, it may be considered, at what sending time, a response rate would be the highest among the current audiences through analysis of historical form distributions.

In an implementation, it may be determined in which approach the form may be distributed. For example, the form may be represented as a link, a QR code, etc., and be sent in an email, embedded in a web page, etc.

At 140, responses to the form may be collected from the audiences. For example, the audiences may select options, input information, etc., in interaction sections in the form and then submit responses to the form, and accordingly, these responses may be collected by the form application, the form client, the form platform, etc., through which the form was distributed previously. In an implementation, it may be determined how many responses are expected to be further collected based on a reduction rate of received responses. In an implementation, it may be determined how many responses are enough for leading to a meaningful statistical result. If potentially to-be-received responses are not significantly, or enough responses have been collected, the collection of responses at 140 may be stopped.

At 150, data analysis may be performed on the collected responses, and a result of the data analysis may be utilized for any further purposes. For example, through the data analysis, a rating may be given for each audience based on a response from the audience, a comprehensive assessment of all the audiences may be obtained based on all the responses from the audiences, a score distribution of a certain question among different audiences may be obtained, and so on. With the result of the data analysis, the user may further explore, e.g., for what reasons such result is caused, what aspects may be further improved, etc. The result of the data analysis may also be shared with other peoples.

Moreover, although not shown in FIG. 1, the collected responses may also be used for evaluating content of the sections in the form, and such evaluations may be further used as original data for enhancing content suggestions in any further forms.

According to the embodiments of the present disclosure, a form may be proactively suggested to be created based on certain detected triggers. For example, when a target entity, e.g., a special date/time point, an event or activity, etc., is detected from other services or applications than applications or platforms for form service, or when it is detected that a user has an intent to collect responses or opinions to a target entity from a certain group of people, the embodiments of the present disclosure may prompt the user to create a form associated with the target entity.

Figure 2:
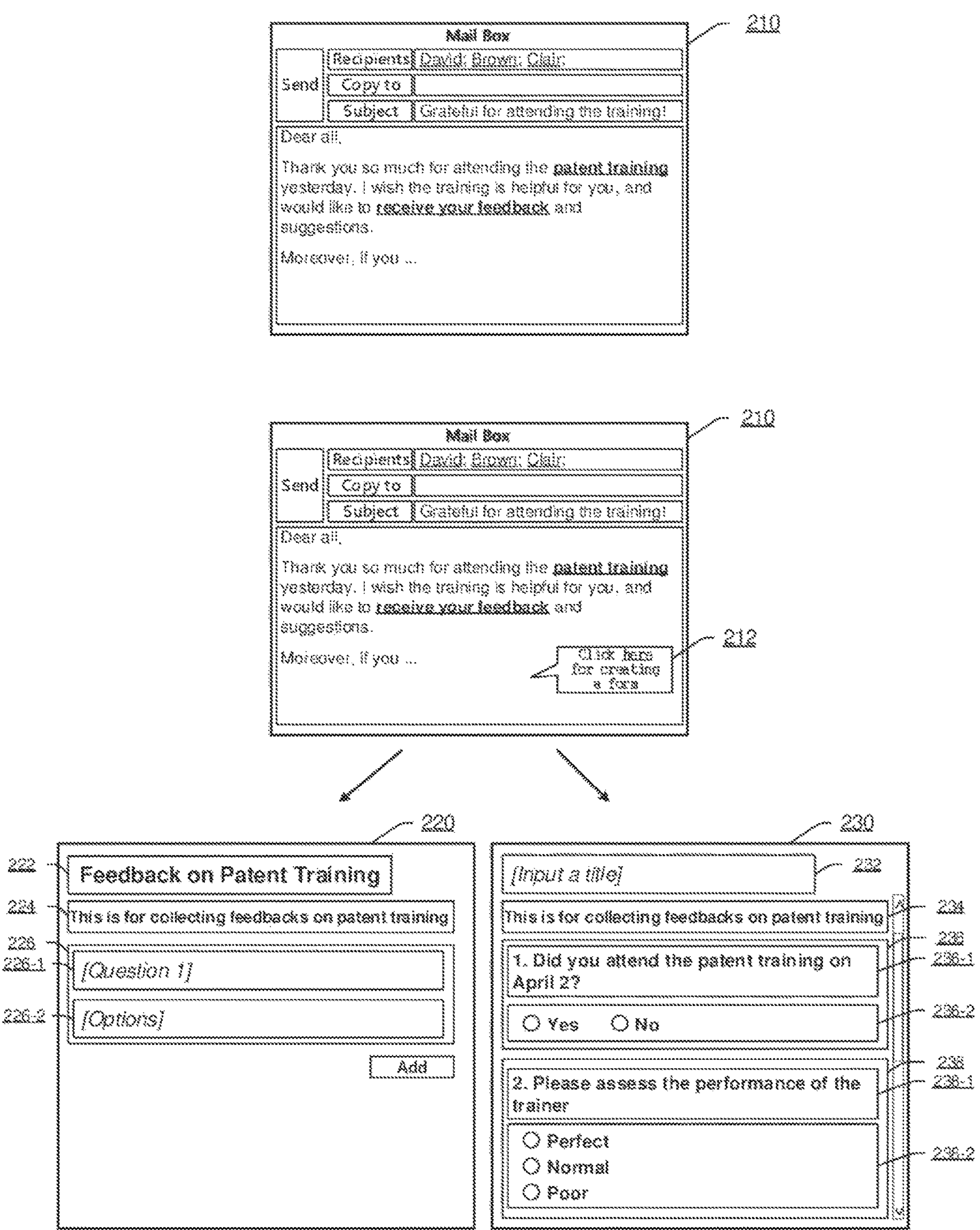
FIG. 2 illustrates exemplary user interfaces for proactively prompting to create a form according to an embodiment.

FIG. 2 illustrates exemplary user interfaces for proactively prompting to create a form according to an embodiment. The user interfaces in FIG. 2 show that a target entity detected in a mail box of a user is used as a trigger for prompting the user to create a form associated with the target entity.

A user interface 210 of the mail box of the user shows that the user is editing an email in the mail box. It may be detected from content of the email that the user wants to obtain feedbacks to a specific event, i.e., "patent training", from the recipients. That is, both a target entity of "patent training" and intent of obtaining feedbacks to the patent training are detected from the mail box application or service.

Based on the detected target entity and the user's intent, a prompt 212, e.g., "Click here for creating a form", may be generated and presented in the user interface 210 of the mail box. The prompt 212 may enable the user to recognize that his need of obtaining feedbacks to the patent training from the recipients may be achieved through a form service.

If the user clicks on the prompt 212, a form associated with the target entity "patent training" may be newly created. In an implementation, no content suggestion is presented for sections in the created form. In other implementations, the created form may already comprise content in one or more sections that is suggested at least according to the target entity.

An exemplary user interface 220 of the form shows that the created form may comprise a title section 222, a title description section 224, and an interaction section 226, wherein the interaction section 226 further comprises a question item 226-1 and an option item 226-2. Content of the title section 222 is suggested as "Feedback on Patent Training", and content of the title description section 224 is suggested as "This is for collecting feedbacks on patent training". No content suggestion is provided in the question item 226-1 and the option item 226-2.

Another exemplary user interface 230 of the form shows that the created form may comprise a title section 232, a title description section 234, an interaction section 236, and an interaction section 238, wherein the interaction section 236 further comprises a question item 236-1 and an option item 236-2, and the interaction section 238 further comprises a question item 238-1 and an option item 238-2. No content suggestion is provided in the title section 232. Content of the title description section 234 is suggested as "This is for collecting feedbacks on patent training". For the interaction section 236, content of the question item 236-1 is suggested as "1. Did you attend the patent training on April 2?", and content of the option item 236-2 is suggested as Yes/No choices. Moreover, for the interaction section 238, content of the question item 238-1 is suggested as "2. Please assess the performance of the trainer", and content of the option item 238-2 is suggested as multiple choice options, e.g., "Perfect", "Normal" and "Poor".

It should be appreciated that all the elements and layout of the elements in the user interfaces in FIG. 2 are exemplary, and according to actual designs and requirements, these user interfaces may be changed in various manners. Moreover, content suggestions may also be made in other sections in the form.

Figure 3:
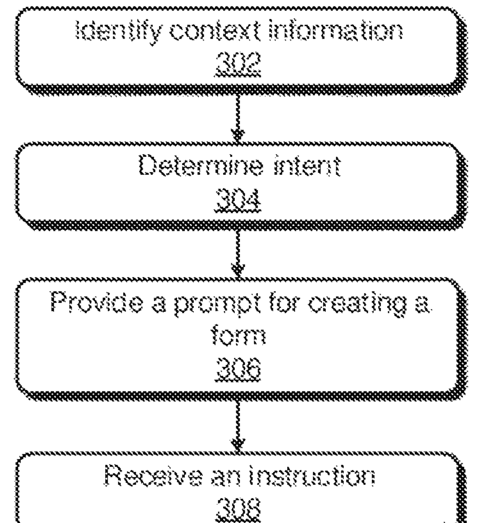
FIG. 3 illustrates an exemplary process of proactively prompting to create a form according to an embodiment.

FIG. 3 illustrates an exemplary process 300 of proactively prompting to create a form according to an embodiment.

At 302, context information associated with completion of a form may be identified from another application or service. Specifically, a target entity may be identified at 302, and information about the target entity may be as a part of the context information. Said another application or service may be various types of application or service that are different from the applications or platforms for form service, used by a user, and running on a terminal device of the user or on a server, e.g., calendar application, document editor, mail application, chatbot, etc. These applications or services may contain various types of information record, e.g., calendar, word document, PPT document, mail box, chat log, etc., from which the target entity and the target entity information may be identified. The identified target entity may be used as a trigger for prompting the user to create a form. In other words, a form may be further created in response to the identification of the target entity.

In an implementation, the target entity may be a specific date or time point. For example, if it is identified from the calendar that the Christmas is approaching, this specific date may trigger to prompt the user to distribute a form regarding a Christmas party invitation.

In an implementation, the target entity may be an event or activity to be participated by the user. The event or activity may be indicated in the calendar, a chat log of the user, an email of the user, etc. Accordingly, such event or activity may trigger to prompt the user to distribute a form regarding the upcoming event or activity.

In an implementation, the target entity may be a task or activity having been completed by the user. The task or activity may be indicated in the calendar, a word document edited by the user, etc. For example, a workshop may be shown as finished in the calendar, a report of an activity may be recited in a word document created by the user, etc. Such task or activity may trigger to prompt the user to distribute a form regarding the completed task or activity.

It should be appreciated that all the target entities discussed above are exemplary, and the embodiments of the present disclosure may cover any other types of target entity capable of triggering to prompt to create a form. Moreover, in an implementation, a machine learning model may be established for identifying a target entity that can trigger to prompt to create a form.

At 304, the process 300 may alternatively determine whether the user has an intent to collect responses or opinions to a target entity from a certain group of people, i.e., the user actually needs a form service. The user's intent may also be determined from another application or service. For example, when the user is editing a word document, the user may type in the word document that he wants to obtain feedbacks to a certain event, and such information in the word document may be used for determining that the user has an intent to create a form. Moreover, for example, when the user is chatting with a chatbot, the user may ask the chatbot to collect opinions to a certain invitation from his colleagues, and such information may also be used for determining that the user has an intent to create a form. In an implementation, a machine learning model may be established for determining a user's intent that can trigger to prompt to create a form.

It should be appreciated that the target entity identified at 302 and the intent determined at 304 may be used independently or jointly for triggering to prompt to create a form.

At 306, a prompt for creating a form may be provided to the user. The prompt may be provided to the user in various approaches, e.g., a pop-up window shown in the application from which the target entity is identified or the intent is determined, a voice message output by a chatbot on a terminal device of the user, etc.

At 308, an instruction for creating a form may be received. For example, when the user sees the provided prompt, the user may click on the prompt to indicate that he wants to create a form, and thus the user's such operation may be deemed as an instruction for creating a form.

At 310, in response to the received instruction, a form may be created and presented to the user in the application or platform for form service, or in the application from which the prompt is triggered. In an implementation, at least one section in the form may include content suggested according to the context information associated with the form identified at 302, wherein the context information may comprise the target entity or the target entity information. In an implementation, the suggested content may comprise at least one of: content of a title section, content of a title description section, content of a question item in an interaction section, content of an option item in an interaction section, etc. Suggestion processes of the content in the created form will be discussed later.

After the newly created form is presented to the user, the user may further edit the form. After receiving an edit operation to the form, content suggested in response to the edit operation may be presented in sections in the form. Edit operations to the form by the user may comprise a modification operation of the content suggested in the section in the newly created form. For example, the user may adjust the suggested content in a way he desires. When receiving the modification operation, a further content suggestion may be provided in other sections. For example, content suggested in response to the modification operation may be presented in one or more other sections in the form. Edit operations to the form by the user may also comprise a content input in another section in the form. For example, the user may type in content in said another section. When receiving the content input, a further content suggestion may be provided in other sections. For example, content suggested in response to the content input may be presented in one or more other sections in the form. In the above examples, the content suggested in response to the edit operation may be generated through: updating the context information based on the edit operation, and generating the suggested content according to the updated context information.

It should be appreciated that, although it is discussed in connection with FIG. 2 and FIG. 3 that a prompt for creating a form may be proactively provided to the user, the embodiments of the present disclosure may also provide content suggestions in a form that is created by the user himself in the application or platform for form service, instead of responding to a prompt for creating a form.

According to the embodiments of the present disclosure, content of a title section in a form, e.g., a title of the form, may be generated based at least on context information associated with completion of the form, and presented in the title section.

Figure 4:
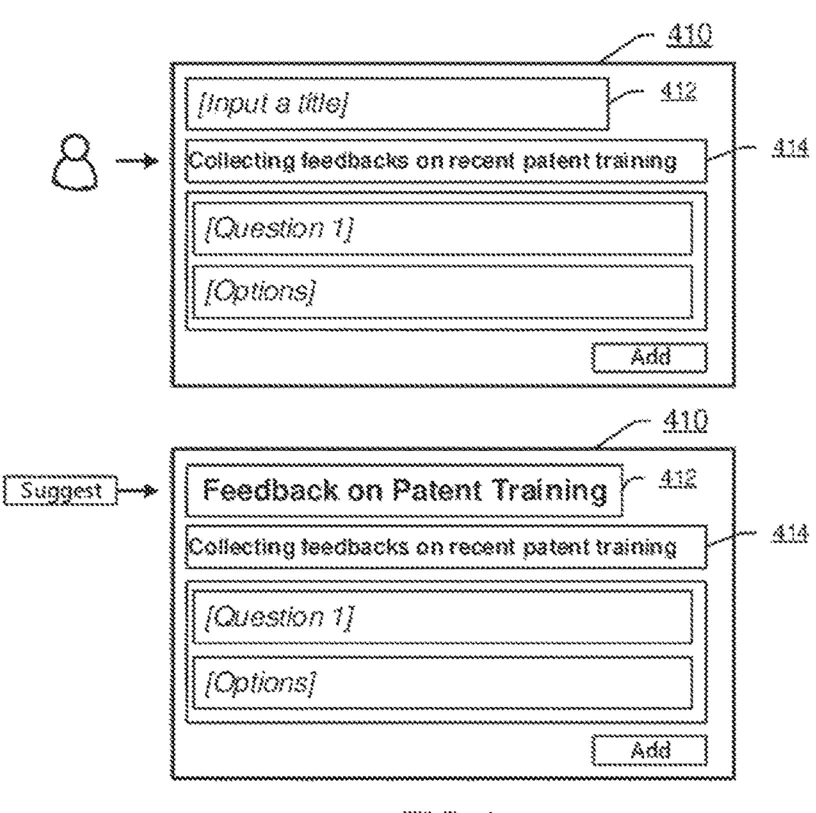
FIG. 4 illustrates exemplary user interfaces for suggesting a title according to an embodiment.

FIG. 4 illustrates exemplary user interfaces for suggesting a title according to an embodiment. The user interfaces in FIG. 4 show that a title may be suggested in response to an input of title description. As shown in a user interface 410 of a form, a user may input content into a title description section 414 in the form, e.g., input a title description "Collecting feedbacks on recent patent training", while does not input any content into a title section 412 or other sections in the form. Then, in response to the content input in the title description section 414, content of the title section 412 may be suggested as "Feedback on Patent Training".

Figure 5:
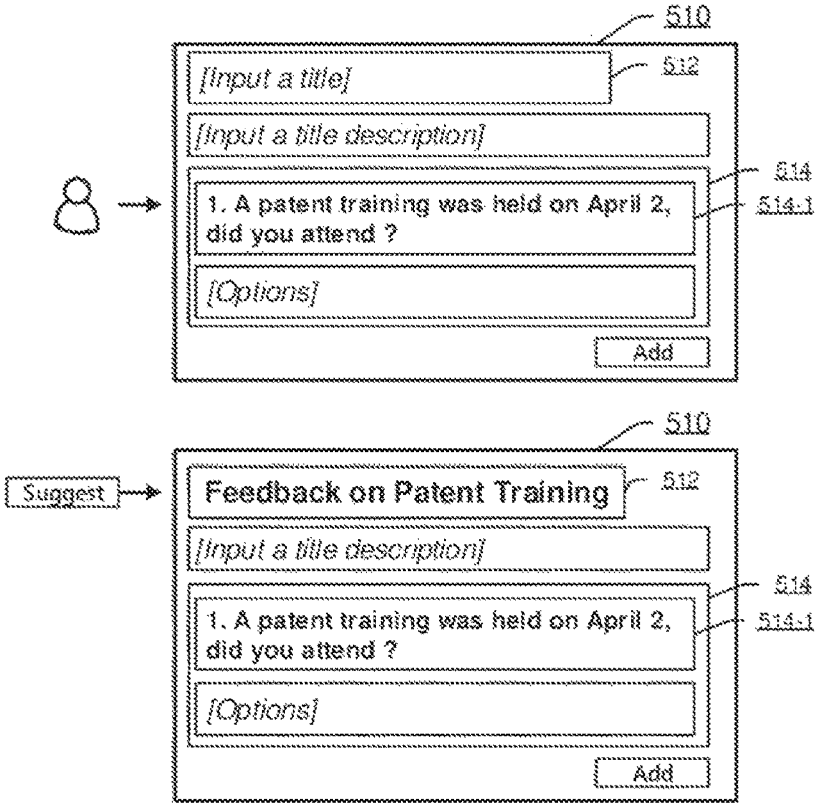
FIG. 5 illustrates exemplary user interfaces for suggesting a title according to an embodiment.

FIG. 5 illustrates exemplary user interfaces for suggesting a title according to an embodiment. The user interfaces in FIG. 5 show that a title may be suggested in response to an input of a question. As shown in a user interface 510 of a form, a user may input content into a question item 514-1 in an interaction section 514 in the form, e.g., input a question "1. A patent training was held on April 2, did you attend?", while does not input any content into a title section 512 or other sections in the form. Then, in response to the content input in the question item 514-1, content of the title section 512 may be suggested as "Feedback on Patent Training".

It should be appreciated that the user interfaces and the content therein in FIG. 4 and FIG. 5 are exemplary, and according to actual designs and requirements, various content may be included or suggested in the user interfaces. Moreover, although it is discussed above that the title is suggested in response to the user's content input in a certain section, the title may also be suggested in response to the user's modification operation to a current content in the section.

Figure 6:
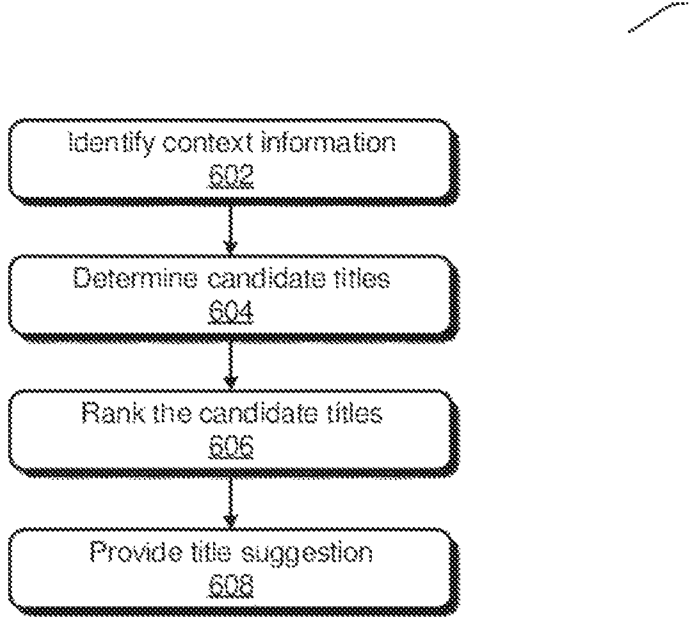
FIG. 6 illustrates an exemplary process of suggesting a title according to an embodiment.

FIG. 6 illustrates an exemplary process 600 of suggesting a title according to an embodiment.

At 602, context information associated with the completion of a form may be identified. The context information may be further used for generating a title for a title section in the form. In an implementation, the identification of the context information may be triggered by a user's content input in a section of the form, i.e., the context information may be updated in response to the user's content input, and the updated context information may be further used for generating a title for a title section in the form.

The context information may comprise target entity information obtained from another application, wherein the form is associated with the target entity. For example, if an event "patent training" is detected, as the target entity, from another application, e.g., mail box, information related to the patent training may also be obtained from the application as target entity information. The information related to the patent training may comprise the date of the patent training, attendees, main knowledge points, etc.

The context information may comprise content having been input or suggested in other sections in the form, e.g., content in a title description section, content in a question item in an interaction section, content in an option item in an interaction section, etc.

The context information may comprise user information. The user information may comprise the user's answers to some questions proposed when the user is creating a form. For example, when the user intends to create a new form, in order to better understand the user's need, the user may be asked by some questions, e.g., "What's the scenario of this form?", "Who are audiences?", etc. The user's answers to these questions may be usable for determining a title suggestion. Moreover, the user information may further comprise the user's profile (e.g., career, job title, etc.), the user's expression habits and patterns, etc.

The context information may comprise theme information of the form. The theme information may include various visual characteristics of the form, e.g., background photo, theme color, font, etc. For example, when a picture relating to greetings of the Christmas is selected as a background photo of the form, such information in the theme may be useful for suggesting a title about Christmas party invitation.

It should be appreciated that the context information may comprise any one or more of the target entity information, the content of other sections, the user information, the theme information, etc. Moreover, all the context information may be converted into attribute tags through predetermined heuristic rules or a previously-trained attribute extraction model. The attribute tags may indicate various attributes derived from the context information, e.g., audiences, purpose, event, date, etc. For example, for a title description "Collecting feedbacks on the recent patent training", at least an attribute tag "purpose=collect feedbacks" may be extracted; for a question "Would you attend this party?", at least an attribute tag "event=party" may be extracted; for a target entity "patent training" and target entity information that colleagues in the department attended the patent training, at least attribute tags "event=training" and "attendee=colleagues in the department" may be extracted; and so on.

At 604, a set of candidate titles may be determined, from which a suggested title may be selected. The candidate titles may comprise the most frequently used titles by other users, which are collected from forms distributed by said other users. The candidate titles may comprise titles previously used by the user, which are collected from the user's historical forms. The candidate titles may further comprise titles generated through template filling. For example, if there exists a template "<date> party invitation" wherein "<date>" is a token replaceable by a real date, and an attribute tag "date=Christmas" is extracted from the context information, then a candidate title "Christmas party invitation" may be generated through replacing the token "<date>" in the template by "Christmas". Moreover, the candidate titles may further comprise titles generated through a natural language generation model. The natural language generation model may be trained for generating a title from the context information or the attribute tags converted from the context information. The training data for the natural language generation model may be a large collection of <title, context information> pairs collected from previous forms. Hereinafter, "previous forms" may refer to those forms previously generated for the current user or other users according to the embodiments of the present disclosure, and those existing public forms available at various content sources. For each of the set of candidate titles, one or more corresponding attribute tags may be labeled.

At 606, the set of candidate titles may be ranked based at least on the attribute tags converted from the context information. In an implementation, a ranking model may be trained for ranking the set of candidate titles based on a set of features. The set of features may comprise, e.g., relevance between an attribute tag of a candidate title and a corresponding attribute tag converted from the context information, coverage rate of attribute tags of a candidate title over the attribute tags converted from the context information, etc.

At 608, a title suggestion may be provided in the title section in the form through selecting the top-ranked candidate titles. In an implementation, the title suggestion may comprise only one suggested title. In another implementation, the title suggestion may comprise two or more suggested titles, and thus the user may select a title from them.

According to the embodiments of the present disclosure, content of a title description section in a form, e.g., a title description of the form, may be generated based at least on context information associated with completion of the form, and presented in the title description section.

Figure 7:
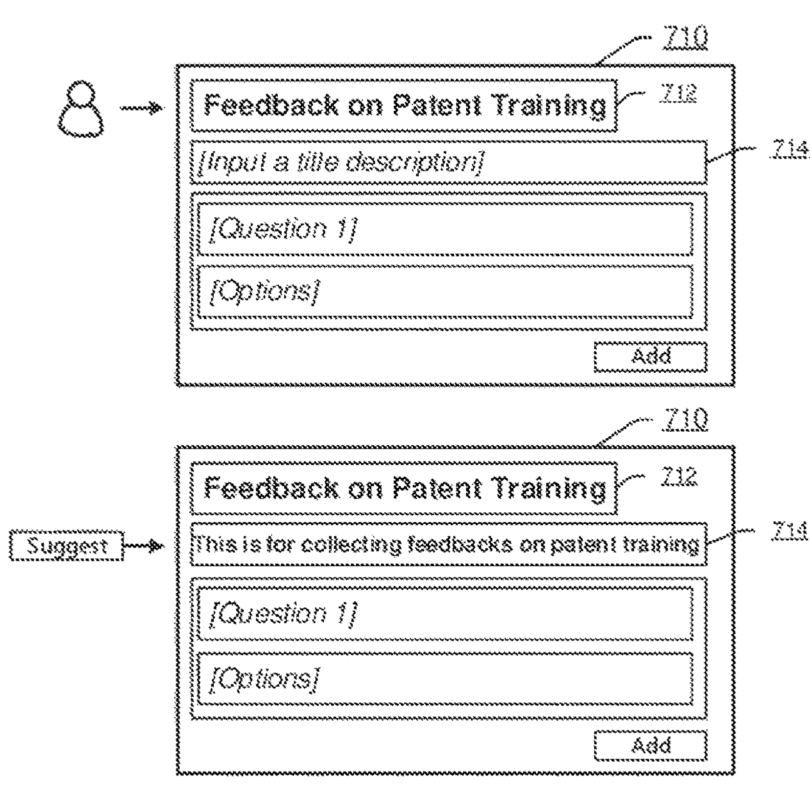
FIG. 7 illustrates exemplary user interfaces for suggesting a title description according to an embodiment.

FIG. 7 illustrates exemplary user interfaces for suggesting a title description according to an embodiment. The user interfaces in FIG. 7 show that a title description may be suggested in response to an input of title. As shown in a user interface 710 of a form, a user may input content into a title section 712 in the form, e.g., input a title "Feedback on Patent Training", while does not input any content into a title description section 714 or other sections in the form. Then, in response to the content input in the title section 712, content of the title description section 714 may be suggested as "This is for collecting feedbacks on patent training".

Figure 8:
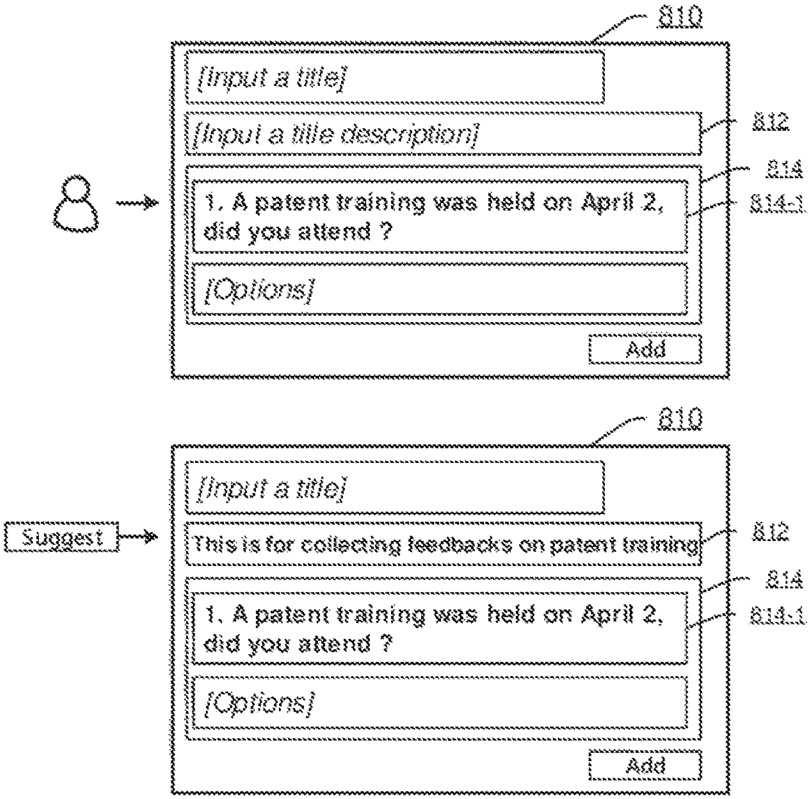
FIG. 8 illustrates exemplary user interfaces for suggesting a title description according to an embodiment.

FIG. 8 illustrates exemplary user interfaces for suggesting a title description according to an embodiment. The user interfaces in FIG. 8 show that a title description may be suggested in response to an input of a question. As shown in a user interface 810 of a form, a user may input content into a question item 814-1 in an interaction section 814 in the form, e.g., input a question "1. A patent training was held on April 2, did you attend?", while does not input any content into a title description section 812 or other sections in the form. Then, in response to the content input in the question item 814-1, content of the title description section 812 may be suggested as "This is for collecting feedbacks on patent training".

It should be appreciated that the user interfaces and the content therein in FIG. 7 and FIG. 8 are exemplary, and according to actual designs and requirements, various content may be included or suggested in the user interfaces. Moreover, although it is discussed above that the title description is suggested in response to the user's content input in a certain section, the title description may also be suggested in response to the user's modification operation to a current content in the section.

Figure 9:
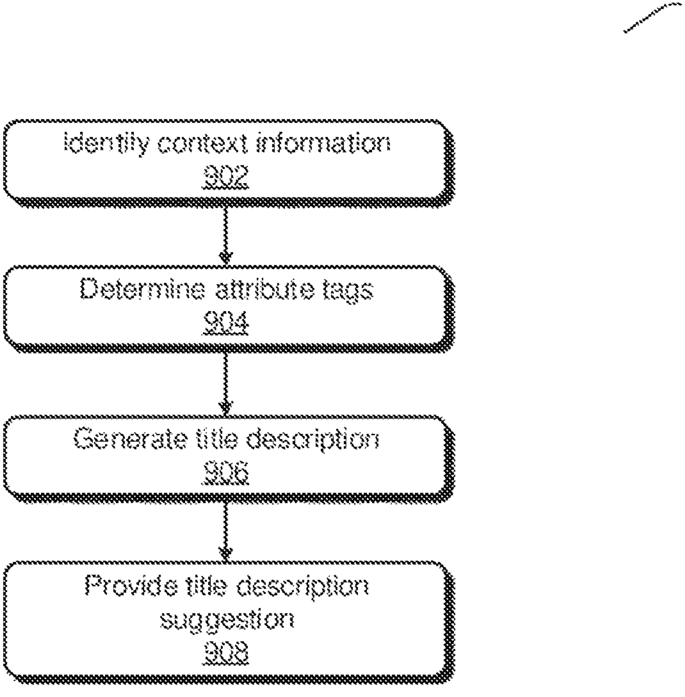
FIG. 9 illustrates an exemplary process of suggesting a title description according to an embodiment.

FIG. 9 illustrates an exemplary process 900 of suggesting a title description according to an embodiment.

At 902, context information associated with the completion of a form may be identified. The context information may be further used for generating a title description for a title description section in the form. In an implementation, the identification of the context information may comprise update the context information in response to a user's content input in a section of the form, and accordingly the updated context information may be further used for generating a title description for a title description section in the form.

The context information may comprise at least one of: target entity information obtained from another application, content having been input or suggested in other sections in the form, user information, theme information of the form, etc. The content having been input or suggested in other sections in the form may comprise, e.g., content of a title section, content of a question item in an interaction section, content of an option item in an interaction section, etc.

At 904, attributes tags may be determined for the context information. In an implementation, the attribute tags may be determined through predetermined heuristic rules or a previously-trained attribute extraction model.

At 906, a title description may be generated through a machine learning model, e.g., a conditional language generation or prediction model. The conditional language generation or prediction model may be trained with a large collection of training data in a format of <attribute tag, title description> pair. The training data may be formed based on a large number of previous forms and attribute tags labeled to these forms. The conditional language generation or prediction model may be applied for taking the attributes tags determined at 904 as inputs, and outputting a title description.

At 908, a title description suggestion may be provided in the title description section in the form.

According to the embodiments of the present disclosure, content of a question item in an interaction section in a form, e.g., question, may be generated based at least on context information associated with completion of the form, and presented in the question item. The embodiments may suggest one question once, or suggest a series of questions together.

FIG. 10 illustrates exemplary user interfaces for suggesting at least one question according to an embodiment. The user interfaces in FIG. 10 show that at least one question may be suggested in response to an input of title. As shown in a user interface 1010 of a form, a user may input content into a title section 1012 in the form, e.g., input a title "Feedback on Patent Training", while does not input any content into other sections in the form. Then, in response to the content input in the title section 1012, content of a question item 1014-1 in an interaction section 1014 may be suggested as "1. Did you attend the patent training on April 2?", and content of a question item 1016-1 in an interaction section 1016 may be suggested as "2. Please assess the performance of the trainer".

FIG. 11 illustrates exemplary user interfaces for suggesting at least one question according to an embodiment. The user interfaces in FIG. 11 show that at least one question may be suggested in response to an input of a question. As shown in a user interface 1110 of a form, a user may input content into a question item 1112-1 in an interaction section 1112 in the form, e.g., input a question "1. A patent training was held on April 2, did you attend?". Moreover, the form has already included a title "Feedback on Patent Training" in a title section and a title description "This is for collecting feedback on patent training" in a title description section. Then, in response to the content input in the question item 1112-1, content of a question item 1114-1 in an interaction section 1114 may be suggested as "2. Please assess the performance of the trainer", that is, another question is suggested in response to the question input by the user.

It should be appreciated that the user interfaces and the content therein in FIG. 10 and FIG. 11 are exemplary, and according to actual designs and requirements, various content may be included or suggested in the user interfaces. Moreover, although it is discussed above that the at least one question is suggested in response to the user's content input in a certain section, the at least one question may also be suggested in response to the user's modification operation to a current content in the section.

Figure 12:
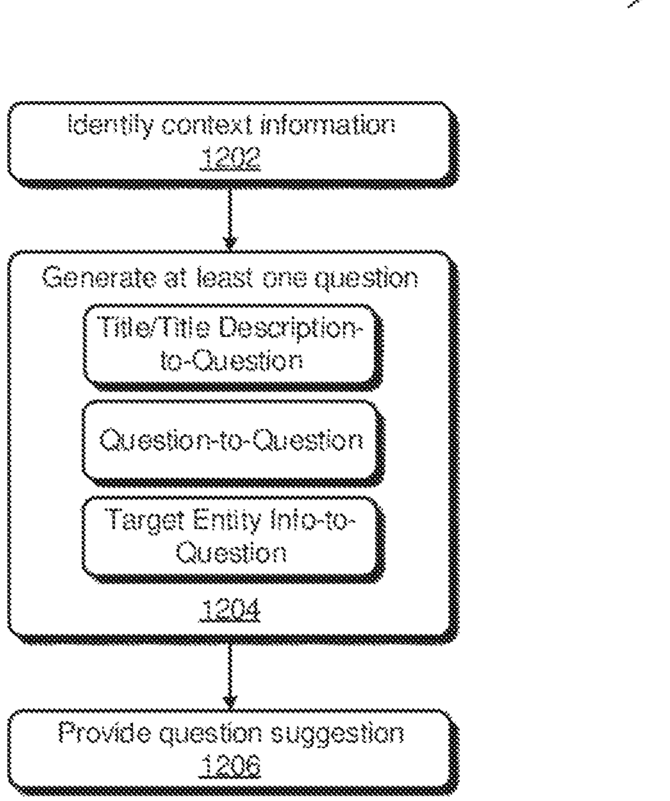
FIG. 12 illustrates an exemplary process of suggesting at least one question according to an embodiment.

FIG. 12 illustrates an exemplary process 1200 of suggesting at least one question according to an embodiment.

At 1202, context information associated with the completion of a form may be identified. The context information may be further used for generating at least one question for question items in interaction sections in the form. In an implementation, the identification of the context information may comprise update the context information in response to a user's content input in a section of the form, and accordingly the updated context information may be further used for generating at least one suggested question.

The context information may comprise at least one of: content of a title section in the form, content of a title description section in the form, content of a question item in at least another interaction section in the form, target entity information, and user information.

At 1204, at least one question may be generated based at least on the context information.

In an implementation, the generation of question may comprise title/title description-to-question generation, i.e., generating at least one question based on a title or a title description. Various approaches may be adopted for generating a question based on a title or a title description.

According to an approach that is based on attribute tags, a large collection of candidate questions may be obtained, and one or more attribute tags may be assigned for each candidate question or a set of candidate questions. Moreover, an attribute tagging model, e.g., a machine learning model, may be trained for automatically predicting attribute tags for an input title/title description. Through comparing attribute tags of the title/title description with attribute tags of the candidate questions, at least one candidate question with the same or most relevant attribute tags as those predicted for the title/title description may be determined as at least one suggested question. For example, for a title "AAAI-19 Conference Registration Form", it may be tagged as "technical conference", "registration", etc., and at least one candidate question having attribute tags of "technical conference", "registration", etc. may be determined as at least one suggested question.

According to another approach, a sequence-to-sequence generation model, e.g., a conditional language generation model, may be trained for automatically generating at least one question from an input title/title description. The training data may be a large collection of <title/title description, question> pairs collected from previous forms, e.g., <"Dinner Invitation", "Number of guests">, <"Dinner Invitation", "Do you have any diet preferences?">, etc. The sequence-to-sequence generation model may be applied for taking the title and/or the title description in the context information as input, and outputting at least one suggested question.

In an implementation, the generation of question may comprise question-to-question generation, i.e., generating at least one another question based on a question. A question-to-question suggestion model may be trained for generating at least one another question based on a question. The question-to-question suggestion model may be in a similar framework with a machine translation model, e.g., a phrase-based statistical machine translation model, or a neural machine translation model. The training data for the question-to-question suggestion model may be in a format of <previous question, next question> pair, and may be collected from previous forms. The question-to-question suggestion model may be applied for taking a question existed in the form as input, and output at least one suggested question.

In an implementation, the generation of question may comprise target entity information-to-question generation, i.e., generating at least one question based on the target entity information, wherein the form is associated with the target entity and the target entity information may be extracted from an application in which the target entity is detected. The target entity information may comprise various types of information related to the target entity. A natural language generation model may be trained for generating at least one question based on the target entity information or attribute tags of the target entity information. The training data may be collected from previous forms, in which questions are labeled by corresponding target entity information or attribute tags of the target entity information. The natural language generation model may be applied for taking the target entity information as input, and outputting at least one suggested question. For example, the questions in the question item 236-1 and question item 238-1 in FIG. 2 may be generated through the natural language generation model.

At 1206, a question suggestion may be provided in at least one question item in interaction sections in the form.

In an implementation, before providing the question suggestion, the questions that are generated through various approaches or generation models as discussed above may be ranked firstly. A ranking model may be trained, which may adopt features, e.g., relevance, fluency, diversity, overall coherence of the entire set of questions in the form, etc. Through the ranking model, the generated questions may be ranked or given respective scores, and the top-ranked one or more questions may be included in the question suggestion to be provided to the user.

According to the embodiments of the present disclosure, an order of questions in a form may be assessed. Usually, questions in a form shall be arranged in an appropriate order so as to improve logicality of the form, enhance acceptability of the form by audiences, and promote the audiences' willingness to respond to the form. For example, some types of questions are not suitable to be asked in the beginning part of the form, e.g., demographic questions including age, income, etc. Audiences may contradict to answer demographic questions in an early stage before having a general recognition of the form, and thus may reject to respond to the form. These questions would be more natural if being asked at the latter part of the form. The embodiments of the present disclosure propose a question order suggestion process. Firstly, intent corresponding to each question in the form may be identified through predetermined heuristic rules or a machine learning model. The machine learning model may be trained by a large collection of training data in a format of <question, intent label> pairs. Intent of a question may refer to a type of the question or what type of information is desired to be obtained through the question, e.g., age, gender, income, opinion, etc. Then, intents of all the questions in the form may be organized as a sequence, e.g., a sequence of words wherein the words are the intents. A language model may be trained for determining probabilities of any sub-sequences in the sequence of the intents. If detecting that a certain sub-sequence reduces a probability of the whole sequence, questions corresponding to this sub-sequence may be determined as in an inappropriate order. Accordingly, a prompt that the order of question items corresponding to the detected sub-sequence is inappropriate may be presented to the user. Thus, the user may further adjust the order of these questions. Moreover, the above question order suggestion process may also be performed during providing question suggestions, such that the suggested question would be in an appropriate order.

According to the embodiments of the present disclosure, it may be determined from a form that whether a necessary question, e.g., a question which should have been included in the form, is missed. Taking a form associated with a party invitation as an example, usually, such form should comprise a question about what diet preference an audience has. If the form does not comprise such question, a prompt may be provided to the user that such question is missed and is better to add into the form. The embodiments of the present disclosure propose a missing question suggestion process. A database may be pre-established based on previous forms. The database may comprise a number of data items, each data item corresponding to a form and comprising at least one attribute tag of the form and a set of candidate intents of questions in the form. The attribute tag of the form may be a type label of the form, which indicates purpose, topic, etc., of the form. The attribute tag of the form may also be an embedding representation of the form, which may be generated through, e.g., performing word embedding on the form in vector spaces. Alternatively, for each form type, a conditional probability P(question_candiate intent|form_attribute tag) may be estimated for questions, and only those questions with conditional probabilities higher than a threshold value would be stored along with the attribute tag of the form in the database. When determining whether a form misses a question, an attribute tag of the form may be firstly determined. Then, a set of candidate intents corresponding to the determined attribute tag of the form may be extracted from the database. A plurality of intents corresponding to questions in the form may be identified. At least one missing candidate intent that is not included in the plurality of intents may be selected from the extracted set of candidate intents. This selected missing candidate intent may indicate that a corresponding question is missed in the form. Accordingly, a prompt that at least one question corresponding to the at least one missing candidate intent is missed may be presented to the user.

According to the embodiments of the present disclosure, content of an option item in an interaction section in a form, e.g., one or more options, may be generated based at least on context information associated with completion of the form, and presented in the option item.

FIG. 13 illustrates exemplary user interfaces for suggesting options according to an embodiment. The user interfaces in FIG. 13 show that options may be suggested in response to an input of a question. As shown in a user interface 1310 of a form, a user may input content into a question item 1312-1 in an interaction section 1312 in the form, e.g., input a question "1. A patent training was held on April 2, did you attend?", while does not input any content into an option item 1312-2 in the interaction section 1312. Then, in response to the content input in the question item 1312-1, content of the option item 1312-2 in the interaction section 1312 may be suggested as Yes/No choices.

Figure 14:
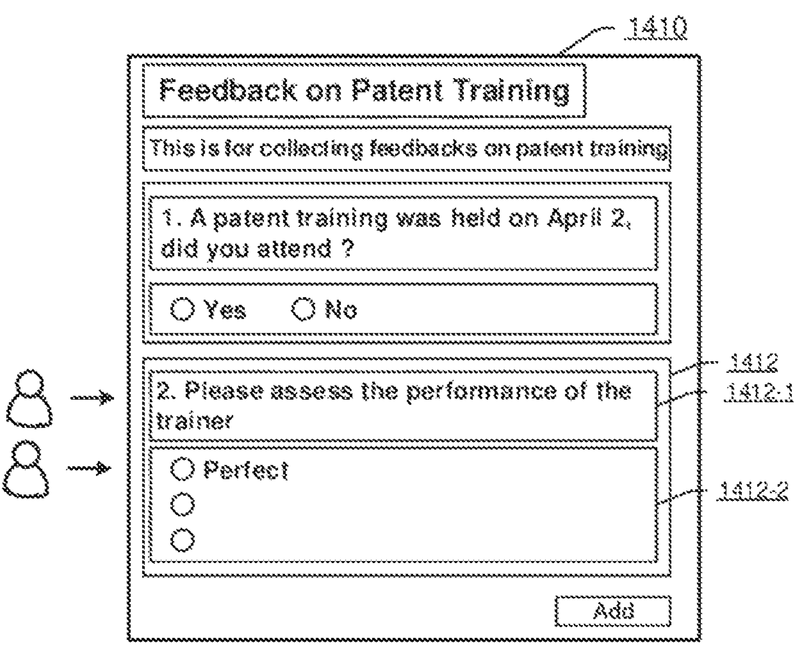
FIG. 14 illustrates exemplary user interfaces for suggesting options according to an embodiment.

FIG. 14 illustrates exemplary user interfaces for suggesting options according to an embodiment. The user interfaces in FIG. 14 show that options may be suggested in response to inputs of both question and a portion of options. As shown in a user interface 1410 of a form, a user may input content into a question item 1412-1 in an interaction section 1412 in the form, e.g., input a question "2. Please assess the performance of the trainer", and also input an option "Perfect" in an option item 1412-2 in the interaction section 1412. However, the user does not finish all the options that are desired to input in the option item 1412-2 yet. Then, in response to the content input in the question item 1412-1 and in the option item 1412-2, content of the option item 1412-2 in the interaction section 1412 may be completed by suggesting remaining options, e.g., "Normal", "Poor", etc.

It should be appreciated that the user interfaces and the content therein in FIG. 13 and FIG. 14 are exemplary, and according to actual designs and requirements, various content may be included or suggested in the user interfaces. Moreover, although it is discussed above that the options are suggested in response to the user's content input in certain sections or items, the options may also be suggested in response to the user's modification operation to a current content in the sections or items.

Figure 15:
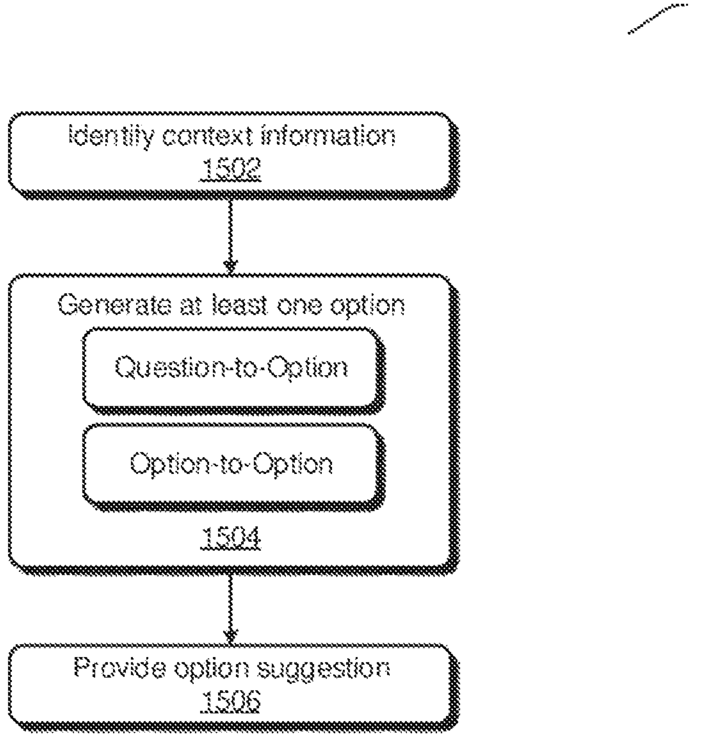
FIG. 15 illustrates an exemplary process of suggesting options according to an embodiment.

FIG. 15 illustrates an exemplary process 1500 of suggesting options according to an embodiment.

At 1502, context information associated with the completion of a form may be identified. The context information may be further used for generating at least one option for an option item in an interaction section in the form. In an implementation, the identification of the context information may comprise update the context information in response to a user's content input in a section of the form, and accordingly the updated context information may be further used for generating at least one suggested option.

The context information may comprise at least one of: content of a question item in the interaction section, incomplete content in the option item, content of other sections in the form, target entity information, and user information.

At 1504, at least one option may be generated based at least on the context information.

In an implementation, the generation of option may comprise question-to-option generation, i.e., generating at least one option based on a question. Various approaches may be adopted for generating at least one option based on a question.

According to an approach that is based on attribute tags, a database may be pre-established based on previous forms. The database may comprise a number of data items, each data item corresponding to a question and comprising at least one attribute tag of the question and a set of candidate options of the question. The attribute tag may be a type of the question. Alternatively, for each question type, a conditional probability P(option|question_attribute tag) may be estimated for each option of the question, and only those options with conditional probabilities higher than a threshold value would be stored along with the question in the database. When generating at least one suggested option for a question, an attribute tag of the question may be firstly determined through, e.g., an attribute tag generation model which is trained for tagging a question. Then, a set of candidate options corresponding to the determined attribute tag of the question may be extracted from the database. The extracted set of candidate options may be presented to the user as the at least one suggested option.

According to another approach, a machine learning model may be trained for automatically generating at least one option from an input question. The training data may be a large collection of <question, at least one option> pairs collected from previous forms. The machine learning model may be applied for taking the question in the context information as input, and outputting at least one suggested option.

In an implementation, the generation of option may comprise option-to-option generation, i.e., generating other options based on at least one option of the same question. For example, the user may input incomplete content in an option item in an interaction section, and accordingly, complete content may be suggested in the option item in response to the incomplete content input in the option item. In other words, if the user only inputs a part of options in an option item, the remaining part of the options may be generated. Various approaches may be adopted for generating at least one option based on an option.

According to an approach, a machine learning model may be trained for automatically predicting one or more options from at least one input option. The training data may be a large collection of <previous options, remaining options> pairs collected from previous forms. The machine learning model may be applied for taking the at least one option existed in the option item as input, and outputting at least one suggested option.

In an implementation, although not shown in FIG. 15, the generation of option may comprise generating other options of a question based on both the question and at least one option having input for the question. Various approaches may be adopted in this case. According to an approach, a machine learning model may be trained for automatically predicting one or more options from a question and at least one input option. The training data may be a large collection of <question, previous options, remaining options> pairs collected from previous forms. The machine learning model may be applied for taking the question in an question item and the at least one option existed in the option item as input, and outputting at least one suggested option for the question.

At 1506, an option suggestion may be provided in the option item in the interaction section in the form.

According to the embodiments of the present disclosure, when receiving a content input in a form by a user, if the content input contains inappropriate expressions, a modification suggestion may be presented to the user. That is, the embodiments of the present disclosure may provide suggestions for polishing or rephrasing the content input by the user. The inappropriate expressions may comprise, e.g., acronym, low frequency term, vague quantification term, ambiguous question, double-barreled question, leading or loaded question, etc.

For content containing acronyms, the acronyms may cause confusion to audiences, and thus may lead to responses in bad quality. It may be suggested to use simple and direct language to replace the acronyms. For example, for an acronym "USPS", this acronym may be modified as "United States Postal Service".

For content containing low frequency terms or words, these terms or words are less often encountered in everyday language, and may be replaced by simple and direct language. For example, the word "affluent" may be modified as "wealthy", and the word "irate" may be modified as "angry".

For content containing vague quantification terms, these terms may communicate uncertain or approximate amounts, and thus may be replaced by specific expressions. For example, a question "Do you exercise regularly?" contains a vague quantification term "regularly", and may be modified as "How many days per week, on average, do you exercise?".

For content containing an ambiguous question, the question may be not easy to understand and audiences need to go back to check the purpose of the form, and thus such question may be replaced by specific expressions. For example, a question "Did you encounter any issues during your experience at [store name]?" is ambiguous because of indefinite meaning of "issues", and may be modified as "A problem is anything major or minor that negatively impacts a shopper's experience. Did you encounter any problems during your experience at [store name]?".

For content containing a double-barreled question, since the question is asking opinions for multiple objects, audiences may not know which object to answer to. Such question may be modified as asking only one thing. For example, a question "Do you think timely and accurate information is important for improving customer service?" contains two objects "timely information" and "accurate information", and may be modified as two independent questions "Do you think timely information is important for improving customer service?" and "Do you think accurate information is important for improving customer service?".

For content containing a leading or loaded question, such question wording may include a reason for audiences' opinions on a particular topic, and this reason may load the question. This also happens when an introduction sentence in the beginning part of a question makes audiences feel, e.g., "It is OK to do this". Such leading or loaded questions should be avoided. For example, a question "How much do you enjoy the movie?" contains a leading word "enjoy", and may be modified as "What do you think of the movie?".

Various inappropriate expressions may be detected from content in a form, and a modification suggestion may be provided based on the approaches as discussed above.

FIG. 16 illustrates exemplary user interfaces for providing a modification suggestion according to an embodiment. As shown in a user interface 1610 of a form, a user may input content into a question item 1612-1 in an interaction section 1612 in the form, e.g., input a question "2. How much do you enjoy the training?". This question may be detected as a question containing inappropriate expressions, e.g., leading question. Then, a modification suggestion 1614, e.g., "It would be better if we say 'What do you think of the training?'", may be provided to the user. If the user clicks on the suggestion, the suggested question may replace the previous question input by the user.

It should be appreciated that the user interfaces and the content therein in FIG. 16 are exemplary, and according to actual designs and requirements, various content may be included or suggested in the user interfaces.

According to the embodiments of the present disclosure, when providing content suggestion for a form to a user, the suggested content may be personalized or customized to the user based at least on context information associated with the form. In an implementation, user information in the context information may comprise expression habits specific to the user that are detected from content in historical forms by the user. For example, the user may have created many forms containing options with emoji, e.g., "☺ I like it", "☹ I don't like it", etc., and thus when providing content suggestion, the suggested content, especially suggested options, may also be attached with corresponding emoji so as to follow the user's expression habits. In an implementation, the user information in the context information may comprise some expression patterns usually used by the user that are detected from content in the historical forms. For example, when asking demographic questions, the user's questions are usually in a pattern of "Your name?", "Your age?", etc., instead of "What's your name?", "What's your age?", and thus when providing content suggestion, the suggested content may also be in such pattern, e.g., "Your marital status?". Furthermore, expression patterns in the user information may also be detected from content having been input by the user in other sections in the current form. That is, the suggested content may also consider the expression patterns the user is being used in the current form. Both the expression habits and the expression patterns may be detected through a machine learning model which is trained for capturing general expression characteristics in a corpus of a specific user. The expression habits and the expression patterns in the user information in the context information may be further applied into various content suggestion generation processes according to the embodiments of the present disclosure as discussed above, so as to encourage adopting the expression habits and the expression patterns in generated content suggestion. For example, the expression habits and the expression patterns may be converted as condition or attention factors that can be applied to various content suggestion generation models as discussed above.

According to the embodiments of the present disclosure, a dynamical adaption process is proposed for dynamically adapting suggested content to a user's content input. Content input by the user may comprise specific entities, however, content suggestion generation models may be not capable of directly generating suggested content containing these entities. The dynamical adaption process may be performed for improving quality of content suggestion in this aspect. For both model training stage and model applying stage, content may be normalized through replacing specific entities, e.g., name, date, etc., by corresponding tokens. For example, a title "CogSci 2019 post-conference review" may be converted as "<CONF_NAME> <CONF_YEAR> post-conference review", wherein the name "CogSci" of the conference is replaced by a token "<CONF_NAME>" and the year "2019" of the conference is replaced by a token "<CONF_YEAR>". Suggested content that are generated by content suggestion generation models may be normalized content, e.g., "Have you ever been to <CONF_NAME>?". Entity information corresponding to the token "<CONF_NAME>" may be identified from the context information. For example, it may be detected from a title "CogSci 2019 post-conference review" input by the user that "<CONF_NAME>" corresponds to "CogSci". Accordingly, the token in the normalized content may be replaced by the entity information so as to derive the content to be presented to the user, e.g., "Have you ever been to CogSci?". Through the dynamical adaption process, content suggestions would be more precise and may meet the user's desires better.

According to the embodiments of the present disclosure, a domain-based refining process may be applied to the content suggestion generation models or processes as discussed above, so as to further improve the precision of content suggestions. The refining process may enable content suggestions to be more adaptive to a user, through considering or emphasizing information in a domain associated with the user during the generation of the content suggestions. Taking the question-to-question suggestion model as an example, this model may be trained based on corpuses from various domains. However, in order to refine question suggestions by this model, a corpus from a domain associated with the user may be especially used for refining the model and accordingly refining the question suggestions. For example, the corpus from the domain associated with the user may be forms previously created by those users that are in the same company with the user. These forms may contain information specific to the domain of this company, e.g., frequently-asked questions in the forms distributed from users of the company, etc. When retraining the question-to-question suggestion model with the previous forms in the company domain associated with the user, the information specific to the domain would facilitate to enable the model to generate suggested questions adaptive to the domain.

According to the embodiments of the present disclosure, content suggestions may be provided during a user is inputting current content in a section in a form. Although the current content is not completely input by the user yet, the part of the current content having been input by the user may be used for updating context information of the form, and accordingly the timely updated context information may be used for generating content suggestions according to the content suggestion generation processes as discussed above.

Figure 17:
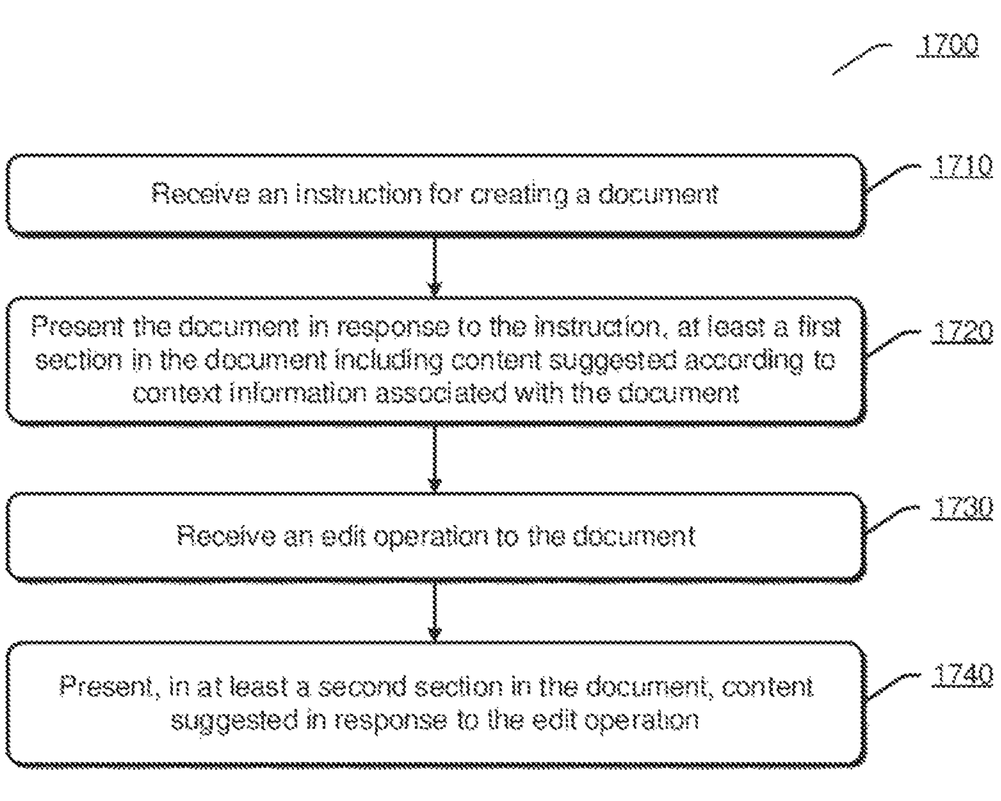
FIG. 17 illustrates a flowchart of an exemplary method for document auto-completion according to an embodiment.

FIG. 17 illustrates a flowchart of an exemplary method 1700 for document auto-completion according to an embodiment.

At 1710, an instruction for creating a document may be received.

At 1720, the document may be presented in response to the instruction, at least a first section in the document including content suggested according to context information associated with the document.

At 1730, an edit operation to the document may be received.

At 1740, content suggested in response to the edit operation may be presented in at least a second section in the document.

In an implementation, the document may be a form. The form may comprise at least one of: survey, training, workshop, registration, voting, test and homework.

In an implementation, the context information may at least comprise a target entity identified from another application, and the document may be associated with the target entity.

In an implementation, the first section may comprise at least one of: a title section, a title description section, and one or more interaction sections. Each interaction section may comprise a question item and an option item.

In an implementation, the receiving the edit operation may comprise: receiving a modification operation of the content of the first section. The presenting the content may comprise: presenting, in the second section, the content suggested in response to the modification operation.

In an implementation, the receiving the edit operation may comprise: receiving a content input in a third section in the document. The presenting the content may comprise: presenting, in the second section, the content suggested in response to the content input.

In an implementation, the receiving the edit operation may comprise: receiving a content input in a question item in an interaction section in the document and/or an incomplete content input in an option item in the interaction section. The presenting the content may comprise: presenting complete content in the option item, the complete content being suggested in response to the content input in the question item and/or the incomplete content input in the option item.

In an implementation, the receiving the edit operation may comprise: receiving a content input in the document. The method may further comprise: presenting a modification suggestion for the content input.

It should be appreciated that the method 1700 may further comprise any steps/processes for document auto-completion according to the embodiments of the present disclosure as mentioned above.

Figure 18:
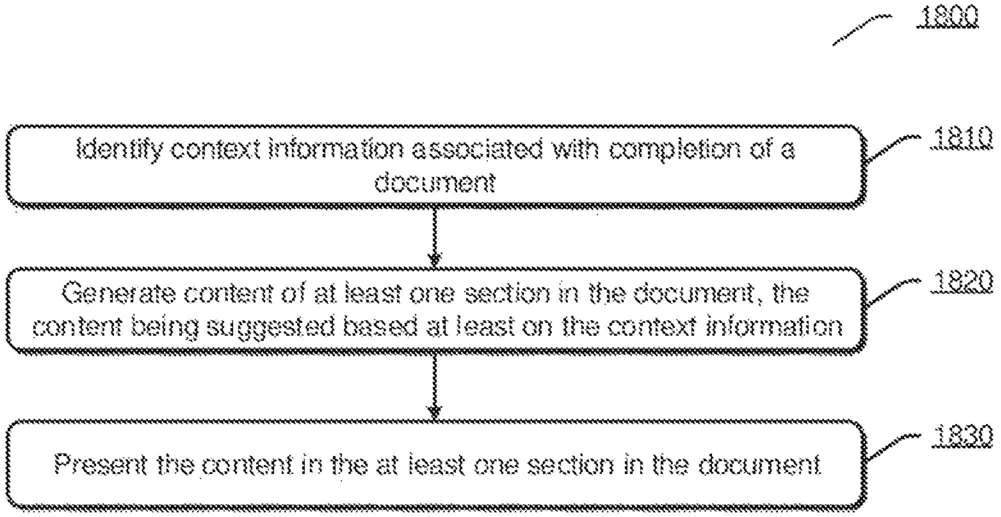
FIG. 18 illustrates a flowchart of an exemplary method for document auto-completion according to an embodiment.

FIG. 18 illustrates a flowchart of an exemplary method 1800 for document auto-completion according to an embodiment.

At 1810, context information associated with completion of a document may be identified.

At 1820, content of at least one section in the document may be generated, the content being suggested based at least on the context information.

At 1830, the content may be presented in the at least one section in the document.

In an implementation, the identifying the context information may comprise: identifying a target entity from another application. The method may further comprise: creating the document associated with the target entity, in response to the identification of the target entity.

In an implementation, the content of the at least one section may comprise content of a title section and/or a title description section. The context information may comprise at least one of: content of other sections in the document, target entity information, and user information.

In an implementation, the content of the at least one section may comprise content of a question item in an interaction section. The context information may comprise at least one of: content of a title section in the document, content of a title description section in the document, content of a question item in at least another interaction section in the document, target entity information, and user information.

In an implementation, the content of the at least one section may comprise content of an option item in an interaction section. The context information may comprise at least one of: content of a question item in the interaction section, incomplete content in the option item, content of other sections in the document, target entity information, and user information.

In an implementation, the generating the content of the at least one section may further comprise: generating normalized content based at least on the context information; identifying entity information from the context information; and deriving the content through replacing a predetermined token in the normalized content by the entity information.

In an implementation, the method 1800 may further comprise: identifying, from the document, content that comprises at least one of acronym, low frequency term, vague quantification term, ambiguous question, double-barreled question, and leading or loaded question; and presenting a modification suggestion for the content.

In an implementation, the method 1800 may further comprise: identifying a plurality of intents corresponding to content of question items in a plurality of interaction sections in the document; determining probabilities of any sub-sequences in a sequence of the plurality of intents through a language model; detecting a sub-sequence that reduces a probability of the sequence; and presenting a prompt that an order of question items corresponding to the detected sub-sequence is inappropriate.

In an implementation, the method 1800 may further comprise: determining an attribute tag of the document; extracting a set of candidate intents corresponding to the attribute tag; identifying a plurality of intents corresponding to content of question items in a plurality of interaction sections in the document; selecting at least one missing candidate intent from the set of candidate intents that is not included in the plurality of intents; and presenting a prompt that at least one question corresponding to the at least one missing candidate intent is missed.

It should be appreciated that the method 1800 may further comprise any steps/processes for document auto-completion according to the embodiments of the present disclosure as mentioned above.

Figure 19:
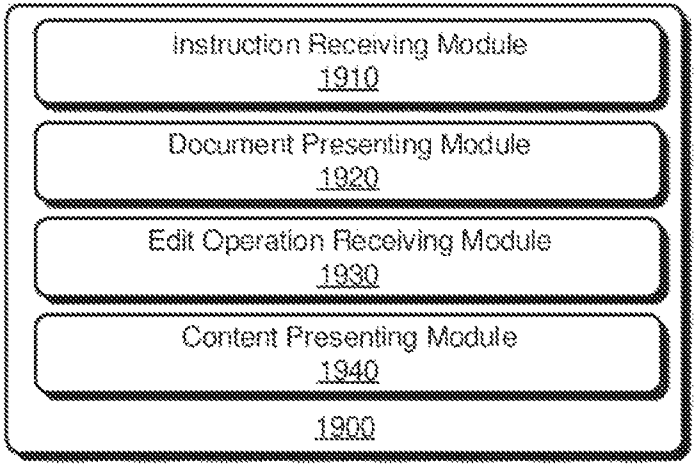
FIG. 19 illustrates an exemplary apparatus for document auto-completion according to an embodiment.

FIG. 19 illustrates an exemplary apparatus 1900 for document auto-completion according to an embodiment.

The apparatus 1900 may comprise: an instruction receiving module 1910, for receiving an instruction for creating a document; a document presenting module 1920, for presenting the document in response to the instruction, at least a first section in the document including content suggested according to context information associated with the document; an edit operation receiving module 1930, for receiving an edit operation to the document; and a content presenting module 1940, for presenting, in at least a second section in the document, content suggested in response to the edit operation.

Moreover, the apparatus 1900 may also comprise any other modules configured for document auto-completion according to the embodiments of the present disclosure as mentioned above.

Figure 20:
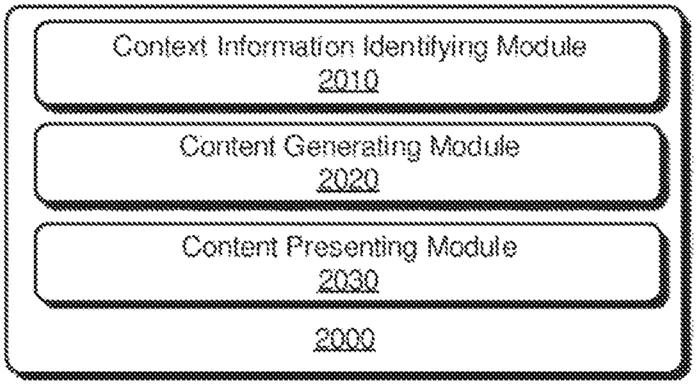
FIG. 20 illustrates an exemplary apparatus for document auto-completion according to an embodiment.

FIG. 20 illustrates an exemplary apparatus 2000 for document auto-completion according to an embodiment.

The apparatus 2000 may comprise: a context information identifying module 2010, for identifying context information associated with completion of a document; a content generating module 2020, for generating content of at least one section in the document, the content being suggested based at least on the context information; and a content presenting module 2030, for presenting the content in the at least one section in the document.

Moreover, the apparatus 2000 may also comprise any other modules configured for document auto-completion according to the embodiments of the present disclosure as mentioned above.

Figure 21:
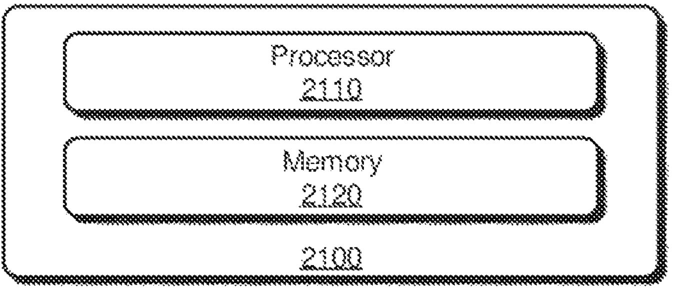
FIG. 21 illustrates an exemplary apparatus for document auto-completion according to an embodiment.

FIG. 21 illustrates an exemplary apparatus 2100 for document auto-completion according to an embodiment.

The apparatus 2100 may comprise at least one processor 2110 and a memory 2120 storing computer-executable instructions. When executing the computer-executable instructions, the at least one processor 2110 may perform any operations of the methods for document auto-completion according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for document auto-completion according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

What is claimed is:

1. A method for document auto-completion, comprising:

identifying a target entity in an application of a user;

providing, in a first user interface, a prompt selectable for creating a new document, the prompt determined based on the target entity and an intent of the user;

receiving an instruction via selection of the prompt in the first user interface to create the new document;

presenting, in a second user interface, the new document in response to the instruction, the new document comprising a form, wherein the new document concurrently presents a first section and a second section of the new document in the second user interface;

wherein at least the first section in the new document includes auto-filled content suggested according to context information associated with the new document;

receiving an edit operation to the auto-filled content of the first section of the new document within the second user interface;

in response to receiving the edit operation to the auto-filled content in the first section, (i) automatically updating the context information associated with the new document, and (ii) automatically generating additional auto-filled content in at least the second section in the new document based on the updated context information; and presenting dynamically adapted content, in at least the second section in the new document during the edit operation occurring in the first section, the dynamically adapted content including the additional auto-filled content which is generated in response to the edit operation.

2. The method of claim 1, wherein the new document is a form, and the form includes at least one of:

survey, training, workshop, registration, voting, test and homework.

3. The method of claim 1, wherein the new document is associated with the target entity and the intent of the user.

4. The method of claim 1, wherein the first section comprises at least one of: a title section, a title description section, and one or more interaction sections, and each interaction section comprises a question item and an option item.

5. The method of claim 1, wherein receiving the edit operation within the second user interface includes receiving a modification operation of the auto-filled content of the first section of the new document, and wherein presenting the dynamically adapted content includes presenting, in the second section during the modification operation, the content suggested in response to the modification operation.

6. The method of claim 1, wherein receiving the edit operation within the second user interface includes receiving a content input from the user in a third section in the new document, and wherein presenting the dynamically adapted content includes presenting, in the second section during the content input from the user, the content suggested in response to the content input from the user.

7. The method of claim 1, wherein receiving the edit operation within the second user interface includes receiving a content input from the user in a question item in an interaction section in the new document and/or an incomplete content input from the user in an option item in the interaction section, and wherein presenting the dynamically adapted content includes presenting complete content in the option item, the complete content being suggested in response to the content input from the user in the question item and/or the incomplete content input from the user in the option item.

8. The method of claim 1, wherein receiving the edit operation within the second user interface includes receiving a content input from the user in the new document, and further comprising presenting a modification suggestion for the content input from the user.

9. An apparatus for document auto-completion, comprising:

processing circuitry; and a memory storing computer-executable instructions that, when executed, cause the processing circuitry to:

identify a target entity in an application of a user;

provide, in a first user interface, a prompt selectable for creating a new document, the prompt determined based on the target entity and an intent of the user;

receive an instruction via selection of the prompt in the first user interface to create the new document;

present, in a second user interface, the new document in response to the instruction, the new document comprising a form, wherein the new document concurrently presents a first section and a second section of the new document in the second user interface, and wherein at least the first section in the new document includes auto-filled content suggested according to context information associated with the new document;

receive an edit operation to the auto-filled content of the first section of the new document within the second user interface;

in response to receiving the edit operation to the auto-filled content in the first section, (i) automatically update the context information associated with the new document, and (ii) automatically generate additional auto-filled content in at least the second section in the new document based on the updated context information; and present dynamically adapted content, in at least the second section in the new document during the edit operation occurring in the first section, the dynamically adapted content including the additional auto-filled content which is generated in response to the edit operation.

10. The apparatus of claim 9, wherein the new document is created based on the intent of the user.

11. The apparatus of claim 9, wherein the instructions further cause the processing circuitry to distribute the new document to a target audience.

12. The apparatus of claim 11, wherein to distribute the new document, the instructions further cause the processing circuitry to determine an approach for distributing the new document.

13. The apparatus of claim 11, wherein the instructions further cause the processing circuitry to collect responses to the new document from the target audience.

14. The apparatus of claim 13, wherein to collect the responses, the instructions further cause the processing circuitry to perform data analysis on the responses, and wherein the data analysis includes evaluating content of the new document for enhancing content suggestions in future documents.

15. The apparatus of claim 9, wherein the first section includes at least one of: a title section, a title description section, and one or more interaction sections, and wherein each interaction section comprises a question item and an option item.

16. The apparatus of claim 9, wherein to receive the edit operation, the instructions further cause the processing circuitry to receive a modification operation of the auto-filled content of the first section of the new document, and wherein to present the dynamically adapted content, the instructions further cause the processing circuitry to present, in the second section during the modification operation, the content suggested in response to the modification operation.

17. The apparatus of claim 9, wherein to receive the edit operation, the instructions further cause the processing circuitry to receive a content input from the user in a third section in the new document, and wherein to present the dynamically adapted content, the instructions further cause the processing circuitry to present, in the second section during the content input from the user, the content suggested in response to the content input from the user.

18. The apparatus of claim 9, wherein to receive the edit operation, the instructions further cause the processing circuitry to receive a content input from the user in a question item in an interaction section in the new document and/or an incomplete content input from the user in an option item in the interaction section, and wherein to present the dynamically adapted content, the instructions further cause the processing circuitry to present complete content in the option item, the complete content being suggested in response to the content input from the user in the question item and/or the incomplete content input from the user in the option item.

19. The apparatus of claim 9, wherein to receive the edit operation, the instructions further cause the processing circuitry to receive a content input from the user in the new document, wherein the instructions further cause the processing circuitry to present a modification suggestion for the content input from the user.

20. An apparatus for document auto-completion, comprising:

a detection module for detecting a target entity in an application of a user;

a first presenting module, for providing a prompt selectable for creating a new document, the prompt determined based on the target entity and an intent of the user;

an instruction receiving module, for receiving an instruction via selection of the prompt to create the new document;

a document presenting module, for presenting the new document in response to the instruction, the new document comprising a form, wherein the new document concurrently presents a first section and a second section of the new document, and wherein at least a first section in the new document includes auto-filled content suggested according to context information associated with the new document;

an edit operation receiving module, for receiving an edit operation to the auto-filled content of the first section of the new document within the document presenting module, wherein in response to receiving the edit operation to the auto-filled content, the edit operation receiving module:

automatically updates the context information associated with the new document, and automatically generates additional auto-filled content in at least the second section in the new document based on the updated context information; and a content presenting module, for presenting dynamically adapted content, in at least the second section in the new document during the edit operation occurring in the first section, the dynamically adapted content including the additional auto-filled content which is generated in response to the edit operation.

* * * * *